United States Patent Office 2,739,145
Patented Mar. 20, 1956

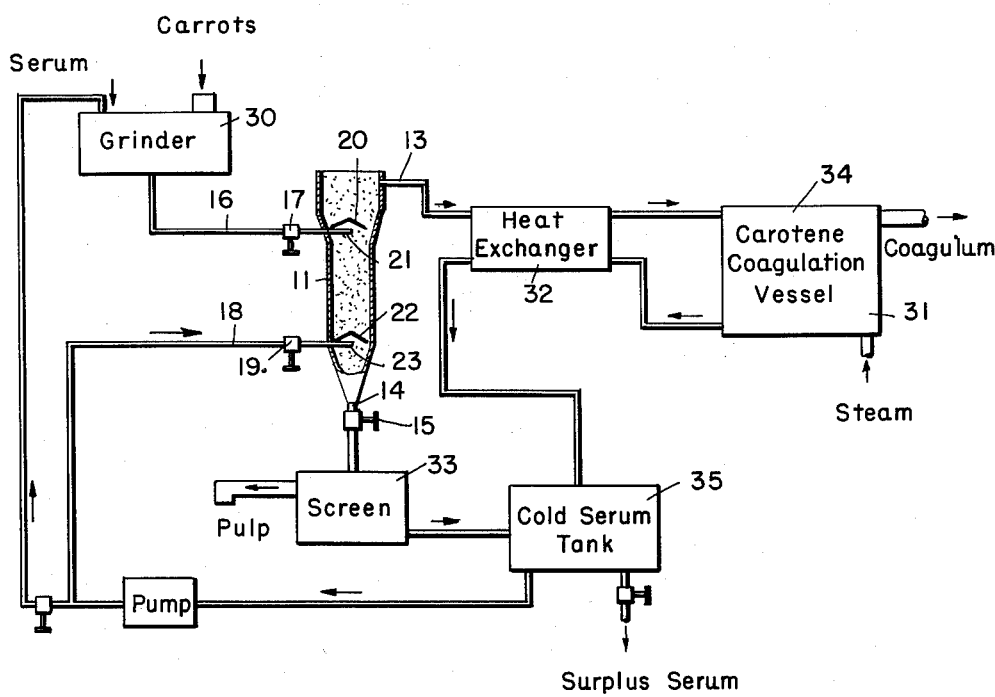

2,739,145
METHOD FOR RECOVERING CAROTENE, FIBER, AND SERUM FROM VEGETABLE MATERIAL

Harold M. Barnett, Long Beach, Calif.

Application January 7, 1952, Serial No. 265,321

14 Claims. (Cl. 260—112)

This invention relates to an improved method for separating carotene from pulverized carrots and the like and for recovering carotene serum.

One object of the invention is to provide a method for the economical separation of carotene, carrot serum and carrot fiber from pulverized carrots. Another object is to provide an improved method for coagulating the carotene separated from carrot pulp. Another object is to provide a method for recovering carrot serum.

It has heretofore been found that the carotene content of thoroughly pulped fresh vegetables such as carrots, sweet potatoes and other carotene containing materials may be substantially completely removed by hydraulically separating the carotene containing particles (which are microscopic in size) from the fiber, and then subsequently recovering the carotene-containing particles by coagulating them and skimming the coagulum from the liquid medium. As heretofore practiced, this process has required the use of relatively large volumes of water compared to the volume of liquid or serum derived from the carrots, so that to recover the carrot serum or the minerals and sugar materials which occur in said serum, it has been necessary to concentrate the much diluted serum by the evaporation of large amounts of water. This is not always an economical procedure. In the old art it has been the practice, also, to use a coagulant such as a mineral acid or salt to effect a change in the physical form of the carotene-protein particles so that they would become filterable. This resulted in the addition of undesired mineral salts or acids to the liquid, and this addition so altered the character of the resulting serum liquid that it had little value as a waste food product. The carotene as combined with or associated in the vegetables with protein particles and oil is also included.

I have now discovered that the natural serum of carrots contains a coagulating agent of unknown chemical constitution which may be utilized for coagulating the separated or coagulated carotene-protein particles. By changing the liquid medium used for physically washing out or separating the carotene-containing particles from the carrot fiber, from water to carrot serum, the washed out carotene-containing particles may be coagulated without the addition of extraneous coagulating agents such as magnesium salts or acids, which have heretofore been used.

My process, as applied to carotene will be understood from the accompanying diagram. The carrots are washed and introduced into the grinder 30 along with a small amount of carrot serum which is returned from subsequent points in the process diagram as will be explained. This is necessary in order to get a slurry of pulverized carrots which will flow in pipes, and thereby facilitate the handling of the pulverized material. The ground pulp is continuously fed to a pulp separator 11 which is shown as the continuous overflow separator described in my co-pending application, Ser. No. 253,737, filed October 29, 1951, now abandoned. In this separator the ground carrot pulp is introduced through the inlet pipe 16 which is located at a position slightly above the enlarged upper portion 12 of the separator. Clear serum derived in a later part of the process, is introduced through the inlet pipe 18 of the separator at a point intermediate the inlet pipe 16 and the discharge opening 14. The pulp inlet pipe 16 is preferably extended into the axis of the cylindrical separator, and the distributing baffle 20 is arranged over the outlet of this pipe to avoid the creation of excessive turbulence in the rising column of liquid. In the same manner the clear liquid or serum inlet pipe 18 extends to the axis of the cylindrical tank 11, and a baffle 22 is provided over the outlet 23 of said pipe 18. An overflow pipe 13 is provided near the top of the separator. By regulating the rate of introduction of the clear serum through the serum inlet pipe 18, the fibers will fall and be discharged at a regulated rate through the fiber discharge opening 14, and the carotene particles are prevented from falling by the rising current of liquid, because of the slight difference in the specific gravity of the fiber and the particles of carotene-protein. The carotene-protein particles are removed from the top of the vessel through the overflow pipe 13 along with a small portion of the liquid, which is carrot serum.

Alternatively, the carotene-protein particles may be washed out of the fibers, as described in my U. S. Patent No. Re. 22,629, using carrot serum as the liquid medium instead of water as described in said patent.

The separated carotene-protein particles with a relatively small part of the original serum as the liquid medium may be then further concentrated by coagulation, for example as described in my co-pending application Ser. No. 265,322, filed January 7, 1952, now abandoned. In general this process consists of introducing live steam into the suspension of carotene-protein particles suspended in serum. The naturally occuring coagulating agent which exists in the carrot serum causes the carotene particles to be coagulated upon the introduction of heat in the form of steam and the carotene coagulum (concentrated to about 1 to 50 parts by weight of fresh carrots is skimmed off the top of the vessel, while the hot serum, free from carotene, is returned (preferably through the heat exchanger 32) to a serum storage tank 35. The serum is withdrawn, as required, from the serum tank 35 for separating out the carotene from the carotene pulp as well as for introduction in small amounts into the grinder 30 to aid in the liquification of the carrot pulp, as previously described. The excess serum can be withdrawn, and if desired, concentrated by evaporation, or it may be used without concentration in various culturing operation as a biotic medium.

Alternatively, the carotene-protein particles suspended in water or serum, or a mixture thereof, may be coagulated in batches as described in my U. S. Patent Re. 22,629.

The carrot serum, when evaporated by pan methods well known in the syrup industry, provides a unique product known as carrot syrup, which contains valuable nutritional factors including invert sugar, minerals and enzymes.

The carrot fiber, with adhering serum, may be used in feeds or it may be refined and used as fine cellulose fiber.

The advantages of my invention will be apparent. By its use, substantially no extraneous aqueous liquid is added in hydraulically separating carotene from carrot pulp and from carrot serum. No extraneous coagulating agents are added and as a result, carrot serum either in dilute or concentrated serum form may be recovered along with the valuable carotene coagulum and the carrot pulp. Fresh carrots are separated into three constitutent parts, carotene-protein coagulum, carrot serum, and carrot pulp, each of which is a valuable product.

I claim:
1. The process of separating carotene-protein particles from fresh carotene-containing vegetable material comprising the steps of mechanically pulping said vegetable material in the presence of more than the normally occurring serum in said material to produce a slurry of carotene-protein particles, vegetable fibes, and vegetable serum, hydraulically separating said carotene-protein particles suspended in a portion of said vegetable serum from said vegetable fibers suspended in the remainder of said vegetable serum, and then separating said serum from the carotene-protein particles.

2. The process of separating carotene-protein particles from fresh carotene-containing vegetable material comprising the steps of mechanically pulping said vegetable material in the presence of more than the normally occurring serum in said material to produce a slurry of carotene-protein particles, vegetable fibers, and vegetable serum, hydraulically separating said carotene-protein particles suspended in a portion of said vegetable serum from said vegetable fibers suspended in the remainder of said vegetable serum, heating said suspension of carotene-protein particles in said vegetable serum without addition of water or extraneous coagulating agents to coagulate said carotene-protein particles, and then separating out said coagulated particles.

3. The process of separating carotene-protein particles from fresh carotene-containing vegetable material comprising the steps of mechanically pulping said vegetable material in the presence of more than the normally occurring serum in said material to produce a slurry of carotene-protein particles, vegetable fibers, and vegetable serum, hydraulically separating said carotene-protein particles suspended in a portion of said vegetable serum from said vegetable fibers suspended in the remainder of said vegetable serum, and then separating said serum from the fibers.

4. The process of separating carotene-protein particles from fresh carotene-containing vegetable material comprising the steps of mechanically pulping said vegetable material in the presence of more than the normally occurring serum in said material to produce a slurry of carotene-protein particles, vegetable serum, hydraulically separating said carotene-protein particles suspended in a portion of said vegetable serum from said vegetable fibers suspended in the remainder of said vegetable serum, heating said suspension of carotene-protein particles in said vegetable serum without addition of water or extraneous coagulating agents to coagulate said carotene-protein particles, separating out said coagulated particles, and screening out said vegetable fibers from said vegetable serum.

5. The process of separating carotene-protein particles from fresh carotene-containing vegetable material comprising the steps of mechanically pulping said vegetable material in the presence of more than the normally occurring serum in said material to produce a slurry of carotene-protein particles, vegetable fibers, and vegetable serum, continuously hydraulically separating said carotene-protein particles suspended in a portion of said vegetable serum from said vegetable fibers suspended in the remainder of said vegetable serum, continuously separating said serum from the fibers, and continuously separating said serum from the carotene-protein particles.

6. The process of claim 5 in which said slurry of fresh vegetable material is diluted with a portion of vegetable serum recovered from the separation steps for said fibers and said carotene-protein particles.

7. The process of claim 1 in which the fresh vegetable material is carrots.

8. The process of claim 2 in which the fresh vegetable material is carrots.

9. The process of claim 3 in which the fresh vegetable material is carrots.

10. The process of claim 4 in which the fresh vegetable material is carrots.

11. The process of claim 5 in which the fresh vegetable material is carrots.

12. The process of claim 6 in which the fresh vegetable material is carrots.

13. A method for continuous removal of carotene particles from a suspension of pulped vegetable material containing carotene particles suspended in vegetable serum comprising the steps of laterally introducing a stream of pulped vegetable suspended in an aqueous medium into a uniformly rising column of aqueous medium including vegetable serum, the velocity of upward flow of said medium being great enough to carry the particles of carotene upwardly but not great enough to overcome the settling of the vegetable fibers, removing said settled out fibers, and removing the floated carotene particles.

14. A method for continuous removal of carotene particles from a suspension of pulped carrots suspended in aqueous carrot serum comprising the steps of laterally introducing a stream of pulped carrots into a uniformly rising column of aqueous liquid including recirculated carrot serum, the velocity of upward flow of said serum being great enough to carry the particles of carotene upwardly but not great enough to overcome the settling of the vegetable fibers, removing said settled out fibers, and removing the floated carotene particles.

References Cited in the file of this patent

UNITED STATES PATENTS

| Re. 22,629 | Barnett | Apr. 17, 1945 |
| 2,567,362 | Berkman et al. | Sept. 11, 1951 |

OTHER REFERENCES

Vetscher: Chem. Abst., vol. 43, col. 3118 (1949).